United States Patent

Moss et al.

[15] 3,661,177

[45] May 9, 1972

[54] FLUID DISTRIBUTORS

[72] Inventors: Gerald Moss, Oxford; Graham L. Johnes, Wantage, both of England

[73] Assignee: Esso Research and Engineering Company

[22] Filed: May 12, 1970

[21] Appl. No.: 36,586

[30] Foreign Application Priority Data

May 14, 1969 Great Britain......................24,581/69

[52] U.S. Cl............................................................137/574
[51] Int. Cl..........................................................F17d 1/10
[58] Field of Search ...............137/574, 614.16, 614.18, 572, 137/573; 138/42; 60/249; 34/57 A

[56] References Cited

UNITED STATES PATENTS

| 1,461,653 | 7/1923 | Grindrod | 138/42 X |
| 2,723,838 | 11/1955 | Peters | 34/57 A |
| 3,016,624 | 1/1962 | Bliss | 34/57 A |
| 3,266,556 | 8/1966 | Malek | 34/57 A |
| 3,298,792 | 1/1967 | Drusco | 34/57 A |
| 3,361,539 | 1/1968 | Pyzel | 34/57 A |
| 3,404,845 | 10/1968 | Schmeling et al. | 34/57 A |
| 3,495,336 | 2/1970 | Gecewich et al. | 34/57 A |
| 3,552,033 | 1/1971 | Steever et al. | 34/57 A |
| 3,553,847 | 1/1971 | Kramer et al. | 34/57 A |

FOREIGN PATENTS OR APPLICATIONS 310,032 7/1930 Great Britain..........................34/57 A Primary Examiner—Samuel Scott
Attorney—Pearlman and Schlager and Louis F. Kreek, Jr.

[57] ABSTRACT

A distributor for distributing fluids substantially uniformly into a hollow vessel for physical and/or chemical process, the distributor having two layers of tiles. The bottom layer of tiles generally fit together but leave apertures in the layer from place to place for the passage of fluid, and each tile in the upper layer is located over, and spaced from a respective aperture, so that fluid passing through the apertures is deflected substantially uniformly over the top of the bottom layer of tiles.

9 Claims, 8 Drawing Figures

FLUID DISTRIBUTORS

This invention relates to distributors for fluids, and especially distributors for use in vessels in which the fluids are to be contained during chemical and/or physical processing. Among such vessels are boilers, kilns and other equipment where combustion is carried out, and in particular fluidized bed boilers and reactors, especially fluidized bed boilers and reactors wherein sulphur is removed from a sulphur-containing fuel by contacting it with a fluidized bed of a material that reacts chemically with the sulphur contained in the fuel to form solid sulphur-containing compounds.

We have found that existing boilers may be adapted so that substantially sulphur-free fuel is burned in the main boiler chamber by providing a fluidized bed of sulphur-reactive material in a fuel gasifier, which may form part of the boiler, e.g. its bottom part, or may constitute a separate unit from the boiler, and supporting the fluidized bed by a distributor.

The construction of an effective distributor, particularly, although not necessarily, when used for this purpose presents a number of problems such as the necessity to distribute air uniformly over the cross-section of the fluidized bed, to support the bed material when the bed is not fluidized and to withstand combustion in the distributor (the so-called underfiring) during a start-up period when the bed is being heated to its operating temperature. The high temperatures developed during underfiring render the use of metal components unsatisfactory because of the problems occasioned by the expansion of the metal: moreover, the use of metal also leads to corrosion problems. Furthermore, there is difficulty in achieving satisfactory structural strength in large units where the bed may be, e.g. 40 feet in diameter and this suggests that the bed should be provided with supports to prevent it from sagging when in a static condition.

The present invention seeks to eliminate or mitigate the foregoing problems and provides a distributor for fluids comprising an array of polygonal tiles, which may be of refractory material, in which some edges of adjacent tiles are contiguous and substantially abut each other and other edges of at least some of the tiles define apertures through which fluids can pass to one side of the array from the other side, and other tiles disposed on the said one side of the array and spaced therefrom, the projected outline of each of said other tiles at least enclosing a respective aperture.

The distributor of the invention may also comprise a supporting structure on the said other side of the array, each tile being spaced apart from the structure by a stem. Preferably the stem is integral with the respective tile and of the same material as the tile, and the stem may be provided with means for attachment to the supporting structure: such means for attachment may be a threaded portion which is received in a bore in the supporting structure, the threaded portion preferably being of metal.

The supporting structure may comprise refractory material facing the said other side of the tiles, and a steel sheet or framework against which the framework is supported: the refractory material may be in the form of precast blocks when a steel framework is employed.

The said threaded portion of each stem, when of metal, preferably is protected against the action of the fluid which, in operation, is distributed, when the fluid is hot or corrosive, by locating that part which is most proximate to the respective tile in a recess in the refractory material of the supporting structure, the threaded part engaging with or being bolted against the steel sheet or framework of the supporting structure.

The tiles in the array are preferably of a polygonal shape, which may with advantage be an irregular polygonal shape. The surface area of each tile in the array is preferably large in comparison with the cross-sectional area of its stem, which latter obstructs the passage of fluid on the said other side of the array.

The said contiguous sides of the tiles in the array may be attached to each other by a suitable refractory cement when the distributor is to be used for distributing hot gases: when cool gases or liquids are to be distributed, a cement which is resistant to any chemical or other erosive action of the gases or liquids will suffice.

The said other tiles preferably have an outline which is of circular shape although outlines or other shapes may be equally suitable. The said other tiles act in a manner similar to the so-called "bubble-caps" of distillation-trays in that they cause lateral distribution of the fluid passing through the array of tiles.

The distributor of the invention which may, for example, be cast in refractory cement (apart from any metal portions of the stems), can be inexpensively produced and it may be scaled up to any required size without providing undue stress or expansion problems, and it will withstand high underfiring temperatures.

The invention also includes a vessel for containing fluids which are to be processed chemically and/or physically, wherein the base of the vessel is provided by a distributor as hereinbefore described.

An embodiment of the invention is further illustrated, by way of example, in the accompanying drawings in which.

Figure 1:
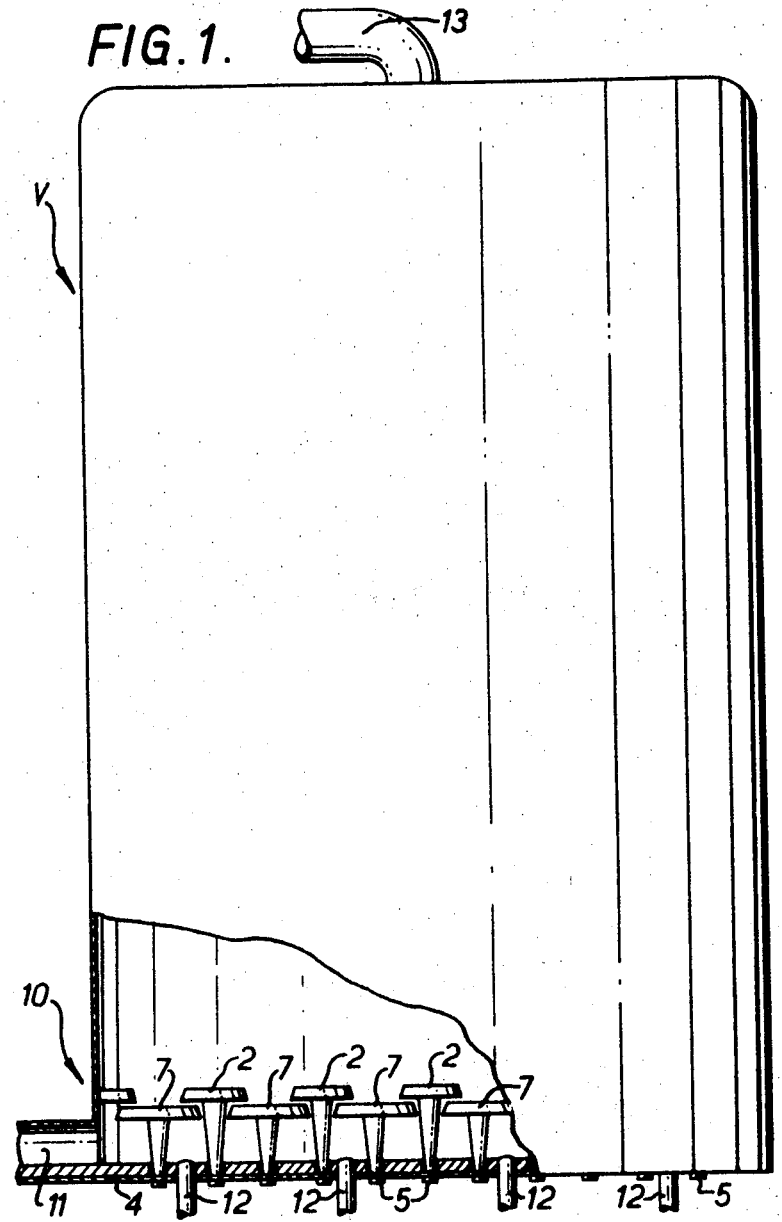
FIG. 1 is a part cross-sectional view of a reaction vessel provided with a distributor at its base.

Referring first to FIG. 1, the vessel V shown has a distributor 10 at its base, the distributor serving to provide a substantially uniform mixture of, say, air entering the vessel via duct 11 and fuel entering the vessel via each of the jets 12 (or atomisers 12 in the case of liquid fuel). The combusted fuel leaves vessel V via an outlet 13.

Figure 2:
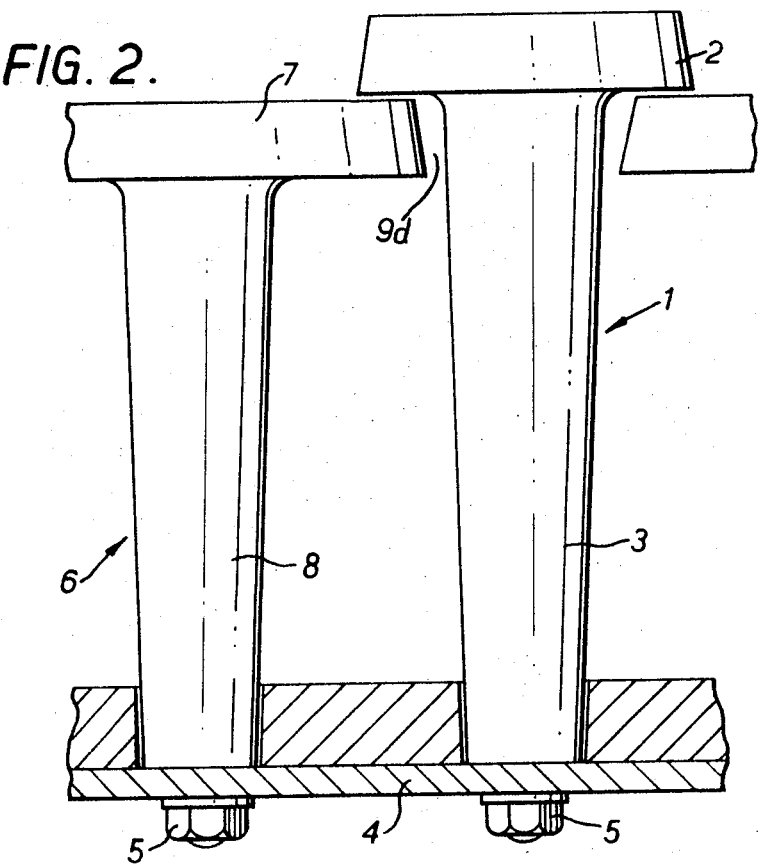
FIG. 2 is a cross-sectional view to a larger scale of part of the distributor of FIG. 1.

The distributor 10, as shown in the drawings and more particularly in FIG. 2, comprises a plurality of spaced tiles cast in refractory cement and arranged so that a first series of tiles projects above a second series of tiles disposed in an array, and which are inter-connected to form, in this instance, a plane surface. The tiles of both series preferably are each cast integrally with a supporting stem or stalk so that they have a form which might be described as "mushroom shaped."

As the caps of the first series of "mushroom" tiles are located above and about the edges of apertures in the plane surface formed by the second series of tiles, a series of gas passages is provided between the two series of tiles, the stems of the tiles being bolted or otherwise secured to a base plate which serves to fix the tiles in position. The base plate is suitably a steel plate lined, at least on its upper surface, with refractory material or it may be a steel framework against which pre-cast refractory blocks rest.

In FIGS. 2 to 7 of the drawings, 1 is a mushroom tile of the first series, comprising a substantially circular cap 2 and a stem 3 integrally formed in castable refractory cement, bolted to a base plate 4 by a bolt 5. 6 is a mushroom tile of the second series provided with a cap 7 and a stem 8 and similarly bolted to the base plate 4. The arrangement of the tiles 1 and 6 is such as to provide gas passages 9 between their caps 2 and 7. The caps 7 of the tiles 6 are of a preferred symmetrical, irregular hexagonal form, the six-sided polygonal caps enabling a series of tiles 6 to be fitted together in an array to form, in this instance, a plane surface.

Due to the irregular symmetrical form of the hexagonal caps 7, the three longer edges of each cap 7 may be fitted against the three longer edges of adjacent caps 7 in the array while each of the three shorter edges defines part of a respective aperture of substantially regular hexagonal shape in the planar surface. The stems 3 of the mushroom tiles 1 extend through these hexagonal apertures and support the caps 2 at a short distance above the planar upper surface of the array of tile caps 7 as shown in FIG. 2. The caps 2 are of circular shape and their diameters are such that their outline projected onto the planar surface defined by the caps 7 encloses or surrounds the hexagonal apertures, as shown in FIG. 3, so that, as will be appreciated from FIGS. 2 and 3, fluids passing upwardly through the gap 9d (FIG. 2) within the hexagonal apertures in the array are deflected laterally across the upper surface of the tile caps 7 thus providing a substantially uniform distribution of fluid from the said upper surface of the distributor 10.

Figure 3:
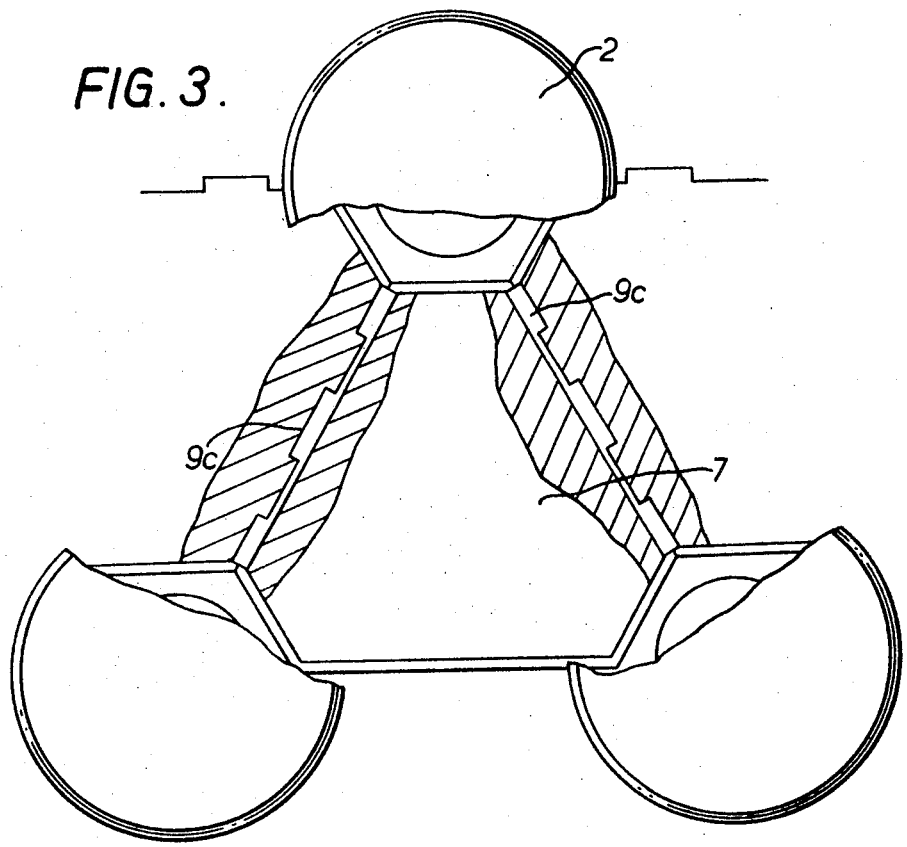
FIG. 3 is a part-sectional plan view of part of the distributor of FIGS. 1 and 2.

It will be seen from FIG. 3 that the apertures between the tile caps 7 are smaller than the tile caps 7, a feature which follows from the use of the smaller edges of the irregular symmetrical tile caps 7 to define the apertures: this is advantageous is most applications of the distributor 10 because the number of stems 8 and 3 supporting all the tile caps 7 and 2 will be small in relation to the area of the surface of the distributor 10, and hence the pressure drop due to the stems 8 and 3 will be minimized. For uniform distribution of fluids by the distributor 10 the pressure drop through the gaps 9d in the hexagonal apertures should be larger than that due to the stems 8 and 3 of the tiles 6 and 8. Moreover, the smaller the number of stems 8 and 3, the smaller will be the weight of the distributor 10 and the strength requirements of the supporting base plate 10 or framework are minimized, and further benefits are derived, in most instances, by the use of less material in the manufacture of the tiles 6 and 8 and in the manhours required for fitting them together to form the distributor 10.

Although the distributor described above provides many benefits, the invention, however, is not limited to distributors having apertures smaller than the tile caps 7, and includes distributors in which the apertures are of substantially equal size to the tile caps 7 (this being obtained by employing mushroom tiles 6 having regular polygonal caps 7) and also distributors in which the apertures are larger than the tile caps 7 (this being achieved by defining the apertures by the longer edges of symmetrical irregular polygonal caps 7). The invention also includes distributors having apertures of more than one size wherein differently shaped and sized polygonal caps 7 are employed. The selection of the relative sizes of aperture and polygonal caps 7 depends on the use to which the distributor of the invention is to be put.

Figure 4:
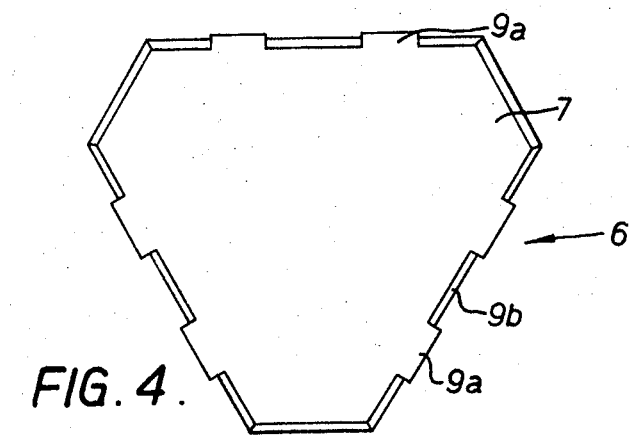
FIG. 4 is a plan view of one type of hexagonal tile.
Figure 5:
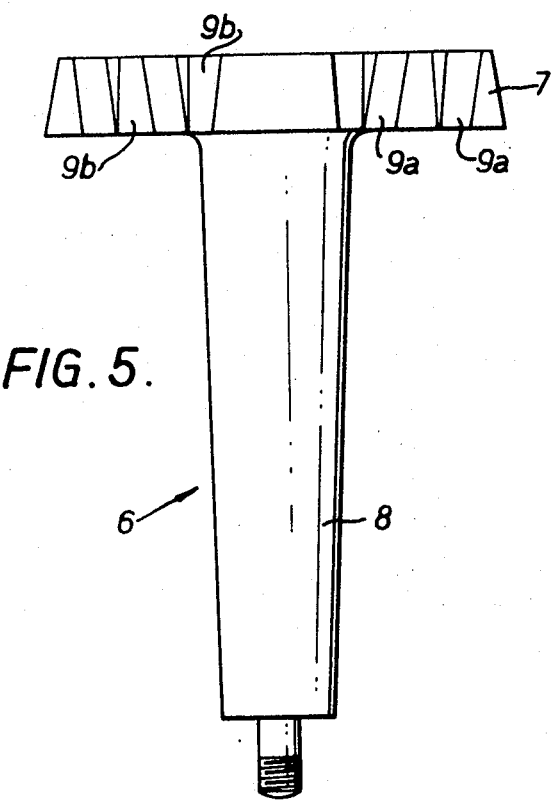
FIG. 5 is an elevational view of the tile of FIG. 4 showing its supporting stem.
Figure 6:
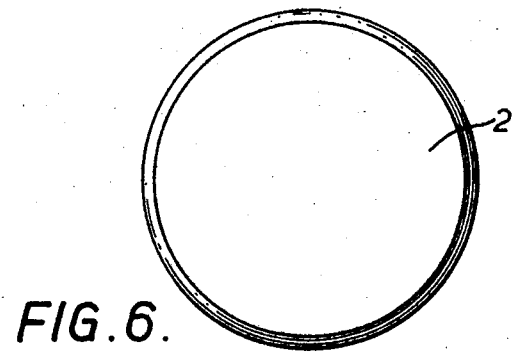
FIG. 6 is a plan view of a tile having a circular outline.
Figure 7:
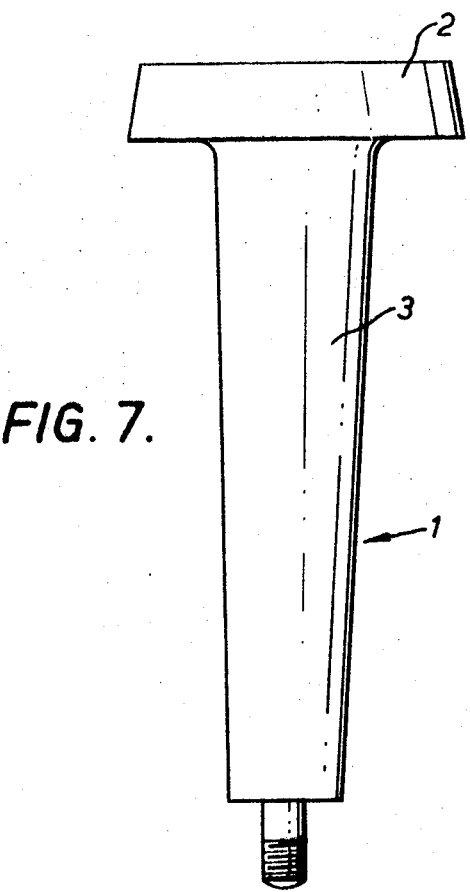
FIG. 7 is an elevational view showing the tile of FIG. 6 and its supporting stem.

In order that fluid distribution takes place substantially only through the apertures provided for the purpose, the caps 7 are cemented together by employing caps 7 of two types, as will be seen from FIG. 3: the first type has plain edges which diverge towards the stem-carrying surface and the second type has key portions 9a which alternate with recessed portions 9b along the edges which are to fit against the edges of adjacent caps 7, i.e. the longer edges of the caps 7. This second type of cap 7 is illustrated in FIGS. 4 and 5 from which it will be seen that the key portions 9a slope outwardly away from the stem-carrying surface and the recessed portions 9b slope outwardly toward the stem-carrying surface.

When the two types of cap 7 are fitted together in the distributor in the manner shown in FIG. 3, refractory cement, indicated by reference 9c, is applied in the spaces between the plain edges of the first type of cap 7 and the keyed and recessed contiguous edges of the adjacent cap 7 so that a substantially fluid tight seal is provided between the contiguous edges of adjacent caps 7.

In fitting the two types of tiles 6 together to form the apertured array in the second series of caps 7 the tiles 6 of the first type are attached to the base plate 5 by bolts 5 as shown in FIG. 2 and refractory cement is applied on those plain edges of the tile caps 7 thereof which are to be contiguous with edges of tile caps 7 of the second type. The tiles 6 of the second type are then bolted into position against the base plate 4 with the appropriate edges of the caps 7 thereof contiguous with the cement-coated edges of the caps 7 of the first type of tile 6. The cement is formed by the contiguous edges into a wedge shape between the recessed portions 9b of the caps 7 of the second type of tile 6 and the plain edges of the caps 7 of the first type of tile 6, and into a rhomboidal shape between the slightly separated key portions 9a of caps 7 of the first type of tile 6 and the contiguous plain edges of the second type of tile 6. The refractory cement, when set thus forms a bond and seal between and along the contiguous edges of adjacent caps 7 and is held in position against the pressure drop across the array of tile caps 7, during use, by the key portions 9a in addition to the bonding forces between the cement and the contiguous edges of the tile caps 7.

Accordingly, fluid can pass from one side of the caps 7 to the other substantially only via the apertures defined by the shorter sides of the caps 7. The actual distribution path through the apertures between the caps 7 of tiles 6 and the tiles 1 is indicated by reference 9d in FIG. 2.

Figure 8:
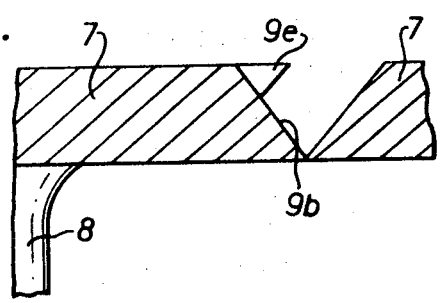
FIG. 8 is a cross-sectional view of the edge region of a tile cap having a form differing from that shown in FIGS. 4 and 5.

An alternative form of key portion for the second type of tile 6 is illustrated in FIG. 8. This form of key portion 9e is generally similar to the key portion 9a illustrated in FIGS. 4 and 5 but differs in that it slopes outwards in a direction away from the stem 8 of the tile 6 starting not from the stem-carrying surface of the tile cap 7 but from a part of the edge of the cap 7 between the two main surfaces thereof, the said part of the edge otherwise sloping outwards towards the stem-carrying surface of the cap 7 and in effect forming a continuation along the edge of the cap 7 of the recessed portion 9b. With this form of key portion 9e, the refractory cement between the key portions 9e of one tile cap 7 and the contiguous plain edge of the adjacent tile cap 7 is substantially trapezoidal in form, the parallel faces being provided by the key portions 9e and the contiguous plane edge. As will be seen from FIG. 8, the refractory cement is not exposed at the edges of the stem-carrying surfaces of the tile caps 7, and consequential benefits are realized in terms of reduced corrosion and erosion of the refractory cement when aggresive conditions exist in contact with the stem-carrying surfaces of the tile caps 7. The main benefit of this form of key portion 9e, however, is that there is improved continuity in the cement along the contiguous edges of adjacent tile caps 7 thus improving the bonding and sealing therebetween.

Although the distributor 10 described with reference to the drawings is for use in distributing fluids to the bottom of a vessel, it may equally well be employed for the distribution of fluids to the sides or top of a vessel. Furthermore, distributors in accordance with the invention need not have the substantially planar shape of the distributor 10, but may be generally of convex or concave form if the intended mode of distribution duty and/or the shape of the vessel so require.

We claim:

1. A distributor for fluids comprising an array of tiles of irregular but symmetrical polygonal shape in which some edges of adjacent tiles are contiguous and substantially abut each other and other edges of at least some of the tiles define apertures through which fluids can pass to one side of the array from the other side, and other tiles disposed on the said one side of the array and spaced therefrom, the projected outline of each of said other tiles at least enclosing a respective aperture.

2. A distributor according to claim 1 in which the tiles in the array are of hexagonal shape.

3. A vessel for containing fluids which are to be processed chemically and/or physically comprising a distributor in accordance with claim 1.

4. A distributor for fluids comprising:
 a. an array of polygonal refractory tiles in which some edges of adjacent tiles are contiguous and substantially abut each other, said contiguous edges being cemented to each other, and other edges of at least some of the tiles defining apertures through which fluids can pass to one side of the array from the other side;
 b. other tiles disposed on the said one side of the array and spaced therefrom, the projected outline of each of said other tiles at least enclosing a respective aperture; and c. a supporting structure on the said other side of the array;

d. each tile having a refractory stem integral therewith and attached to said supporting structure, said tile being fixedly spaced apart from said supporting structure by said stem.

5. A distributor according to claim 4 in which the tiles are of irregular polygonal shape.

6. A distributor according to claim 4 in which the outline of the said other refractory tiles is circular.

7. A distributor according to claim 4 in which the supporting structure comprises refractory material facing the said other side of the tiles, and a steel sheet or framework against which the refractory material is supported.

8. A distributor according to claim 4 in which the stem is provided with means for attachment to the supporting structure.

9. A distributor according to claim 8 in which the said means comprises a threaded portion which is receivable in a bore in the supporting structure.

* * * * *